United States Patent [19]

Hammer et al.

[11] 4,356,199

[45] Oct. 26, 1982

[54] TUBULAR PACKAGING MATERIAL AND METHOD FOR ITS MANUFACTURE

[75] Inventors: Klaus-Dieter Hammer, Mainz; Wolfgang Heinrich, Salach; Guenter Gerigk, Oberursel; Max Bytzek, Wiesbaden, all of Fed. Rep. of Germany

[73] Assignee: Hoechst Aktiengesellschaft, Frankfurt am Main, Fed. Rep. of Germany

[21] Appl. No.: 290,059

[22] Filed: Aug. 4, 1981

[30] Foreign Application Priority Data

Aug. 8, 1980 [DE] Fed. Rep. of Germany ....... 3030035

[51] Int. Cl.$^3$ .................... F16L 11/00; B65D 81/34; B05D 3/12; A23G 1/00
[52] U.S. Cl. .................................. 426/105; 426/135; 427/230; 427/324; 427/336; 427/379; 427/407.1; 428/503; 428/505; 428/527; 428/536
[58] Field of Search ............... 428/36, 503, 505, 527, 428/536; 426/105, 135, 138; 427/230, 324, 336, 379, 407.1

[56] References Cited

U.S. PATENT DOCUMENTS

| | | | |
|---|---|---|---|
| 2,345,543 | 3/1944 | Wohnsiedler et al. | 260/29.4 R |
| 2,616,874 | 11/1952 | Yost et al. | 528/263 |
| 2,796,362 | 6/1957 | Wooding et al. | 428/436 |
| 2,926,154 | 2/1960 | Keim | 260/29.2 EP |
| 2,999,757 | 9/1961 | Shiner et al. | 264/198 |
| 3,378,379 | 4/1968 | Shiner et al. | 138/118.1 |
| 3,679,435 | 7/1972 | Klenk et al. | 428/36 |
| 3,935,320 | 1/1976 | Chiu et al. | 426/105 |
| 3,937,672 | 2/1976 | Busch et al. | 260/17.3 |
| 4,198,325 | 4/1980 | Hammer et al. | 428/36 |
| 4,283,426 | 8/1981 | Schenk et al. | 428/36 |
| 4,289,171 | 9/1981 | Rassbach | 428/36 |

FOREIGN PATENT DOCUMENTS 2246829 7/1980 Fed. Rep. of Germany .

OTHER PUBLICATIONS

DT-AS 1024322 Fed. Rep. Germany (DE) published 2-13-58 Claim 1 in English.
DE-OS 2437781 Fed Rep. Germany (DE) published 2-19-76 Claims 1, 4 and 7 in English.
Farberei- und Textilchemische Untersuchungen by Dr. Andreas Agster, pp. 400 and 401 (1956).
Association of Cellulose and Paper Chemists and Engineers Technical Bulletin (Merkblatt IV/33/57.
DT-AS 1492708 Germany (DE) published 4-27-1972.
DE-OS 2832926 Germany (DE) published 2-7-1980.

*Primary Examiner*—William J. Van Balen
*Assistant Examiner*—17,18
*Attorney, Agent, or Firm*—Schwartz, Jeffery, Schwaab, Mack, Blumenthal & Koch

[57] ABSTRACT

Disclosed is a tubular packaging material for sausage casings, comprising a carrier tubing comprised of cellulose hydrate and containing in its wall from about 5 to 12% by weight of water and from about 18 to 28% by weight of a plasticizer; and a coating on the inside and on the outside of the carrier tubing of a water-insoluble heat-cured synthetic condensation product wherein the carrier tubing is characterized by a swelling value in the range from about 80 to 120%, and the tubular packaging material, after soaking in water at a temperature between about 40° to 50° C. for a period of about 30 minutes and subsequent cooling to about room temperature, is characterized by dimensions in the wet state which are 2 to 6% greater than those before the soaking in water. Also disclosed are methods for preparing the packaging material.

18 Claims, No Drawings

TUBULAR PACKAGING MATERIAL AND METHOD FOR ITS MANUFACTURE

BACKGROUND OF THE INVENTION

The present invention relates to a tubular packaging material, in particular to a sausage casing having a cellulose hydrate-based carrier tubing bearing a water-insoluble condensation product on at least one side, and also to processes for its manufacture and to the use of the packaging material.

When artificial sausage casings are used in accordance with their intended purposes, they are usually soaked in water before they are filled with a sausage emulsion, in order to provide them with the suppleness which is a pre-condition for filling the casings with a sausage emulsion without causing damage. For soaking in water, water at a temperature of about 40° to 50° C. is allowed to act on the casings for a period of about 30 minutes.

In the manufacture of artificial sausage casings based on cellulose hydrate (U.S. Pat. No. 2,999,757), the tubing of cellulose hydrate gel is dried under conditions under which the tubing volume increases. In the case of these tubular casings, the surface area decreases during the soaking in water, before they are used in accordance with their intended purpose, by about 3 to 6%, relative to the area before soaking in water. The tubular casings which have been soaked in water and shrunk in this manner are then filled in the known manner with a sausage emulsion, by forcing the latter into the tubular casing which is closed at one end, and then sealing the other end of the casing.

SUMMARY OF THE INVENTION

It is an object of the present invention to provide an improved tubular packaging material which can be used as an artificial sausage casing for sausage preserves, and which is composed of a carrier tubing based on cellulose hydrate and on the wall of which a water-insoluble heat-cured synthetic condensation product is present.

It is another object of the invention to provide such a packaging material wherein a tubular packaging casing initially increases its dimensions, due to soaking in water before it is used in accordance with its intended purpose, and subsequently makes close contact with the filling after it has been filled with a sausage emulsion and dried.

It is also an object of the invention to provide a packaging material wherein, due to the structural and chemical composition of the packaging material and the structural properties of the carrier tubing, the material is substantially resistant to an enzymatically caused degradation of the cellulose hydrate molecules forming the tubing, in particular as the result of the action of the enzymes known as cellulases.

Another object of the invention resides in providing a method for manufacturing such a packaging material, particularly in the form of a tubular sausage casing.

In accomplishing the foregoing objects, there has been provided in accordance with one aspect of the present invention a tubular packaging material, preferably a sausage casing, comprising a carrier tubing comprised of cellulose hydrate and containing in its wall from about 5 to 12% by weight of water and from about 18 to 28% by weight of a plasticizer for cellulose hydrate, in each instance relative to the total weight of the carrier tubing; and a coating on the inside and on the outside of the carrier tubing of a water-insoluble heat-cured synthetic condensation product comprised of urea/formaldehyde, formaldehyde/melamine, epichlorohydrin/polyamine or epichlorohydrin/polyamine/polyamide, wherein the carrier tubing is characterized by a swelling value in the range from about 80 to 120%, and the tubular packaging, after soaking in water at a temperature between about 40° to 50° C. for a period of about 30 minutes and subsequent cooling to about room temperature, is characterized by dimensions in the wet state which are about 2 to 6% greater than those before soaking in water. In one preferred embodiment, the carrier tubing is comprised of cellulose hydrate which has been chemically modified by means of an organic chemical compound which has at least two N-methylol groups in the molecule.

In accordance with another aspect of the present invention there has been provided a process for the manufacture of the foregoing packaging material comprising the steps of treating at least the outside surface of a plasticizer-containing tubing which is comprised of cellulose hydrate gel and which has not yet been subjected to any preceding heat treatment, with a fluid containing a water-soluble pre-condensate comprising urea/formaldehyde, formaldehyde/melamine, epichlorohydrin/polyamine or epichlorohydrin/polyamine-polyamide; passing the treated tubing continuously along its longitudinal axis through a first heat-treating zone under conditions which permit shrinking and thus drying it, the effective temperature being in the range from about 70° to 90° C. at the beginning of the first heat-treating zone and being in the range of from about 100° to 130° C. at the end of the first heat-treating zone; remoistening the dried tubing; and passing the tubing continuously through a second heat-treating zone and thus drying it, wherein the speed of advance of the tubing at the outlet of the second heat-treating zone is equal to or at most 2% greater than that at the inlet to the second heat-treating zone.

According to another embodiment of the process of the invention, the process comprises the steps of treating both the outside and the inside surface of the plasticizer-containing tubing with a fluid containing the water-soluble pre-condensate; and subjecting the treated tubing to a single heat-treatment under conditions which permit shrinking of the tubing, the temperature prevailing during heat-treatment being sufficient to form the water-insoluble, heat-cured synthetic condensation product from the pre-condensate and to dry the tubing. When the tubing does not contain a cross-linking agent, the temperature at the beginning of the heat-treatment is in the range from about 90° to 110° C. and the temperature prevailing at the end of the heat-treatment is in the range from about 140° to 160° C. On the other hand if the tubing contains in its wall a chemical agent containing at least two N-methylol groups in the molecule for cross-linking the cellulose hydrate molecules, the tubing is subjected at the beginning of the heat-treatment to a temperature in the range of from about 70° to 90° C. and at the end of the heat-treatment to a temperature in the range of from about 100° to 130° C.

In accordance with still another aspect of the invention, there has been provided a sausage casing comprising the tubular packaging material defined above, as well as a sausage product further comprising a sausage filling contained inside of the casing.

Further objects, features and advantages of the present invention will become apparent from the detailed description of preferred embodiments which follows.

DETAILED DESCRIPTION OF PREFERRED EMBODIMENTS

The carrier tubing based on cellulose hydrate is preferably fiber-reinforced. Advantageously, the fiber-reinforcement consists of a fiber web, particularly preferably a paper fiber web, incorporated in the tubing wall. The carrier tubing can also represent a paper fiber web which is impregnated with cellulose hydrate, with a fiber-free cellulose hydrate coating being present on the outside.

The term carrier tubing based on cellulose hydrate also includes types of carrier tubing which are composed of chemically modified cellulose hydrate and are preferably fiber-reinforced.

The feature characterizing chemically modified cellulose hydrate is that the cellulose hydrate molecules are mutually cross-linked by polyfunctional organic chemical compounds. The chemical cross-linking of the cellulose hydrate molecules is effected by a chemical cross-linking agent which contains at least two reactive N-methylol groups in the molecule, which are capable of reacting with the reactive groups of cellulose hydrate molecules. Cyclic urea compounds having at least two N-methylol groups in the molecule, for example, the following cyclic urea derivatives described in U.S. Pat. No. 3,937,672 as chemical compounds for cross-linking cellulose hydrate molecules, are particularly suitable: dimethylol-ethylene-urea (1,3-dimethylolimidazolid-2-one); dimethylol-dihydroxyethylene-urea (1,3-dimethylol-4,5-dihydroxy-imidazolid-2-one); dimethylol-ethyl-triazinone; 3,5-dimethylol-3,5-diaza-tetrahydropyr-4-one; tetramethylol-acetylenediurea; dimethylol-propylene-urea; dimethylol-hydroxypropylene-urea; dimethylol-tetramethyl-propylene-urea; and the 2-dimethylolcarbamate of glycol 1-monomethyl ether. The chemically modified cellulose hydrate contains the said, preferably polyfunctional chemical compounds in a quantity within the range from about 0.5 to 5% by weight, for example, 2% by weight, relative to the weight of cellulose hydrate.

The process for chemically modifying cellulose hydrate with the aid of the said chemical compounds is also described in the above-cited U.S. patent, the disclosure of which is hereby incorporated by reference.

The cellulose hydrate, or chemically modified cellulose hydrate, forming the carrier tubing of the product has a swelling value (water-retention capacity) in the range of from about 80 to 120%, advantageously from about 80 to 115%, in particular from about 80 to 105%, and with very particular advantage from about 90 to 100%. To obtain the success desired according to the invention, it is essential that the swelling value of the cellulose hydrate forming the carrier tubing is smaller than about 120%, and in particular not greater than about 115%.

The swelling value indicates that quantity of water or aqueous solution in percent by weight, relative to the weight of the cellulose hydrate or chemically modified cellulose hydrate forming the carrier tubing, which can be bound by the material of the carrier tubing.

The swelling value is determined according to DIN 53,814, described in "Faerberei-und textiltechnische Untersuchungen [Investigations in Dyeing and Textile Technology]", A. Agster, page 450, Springer-Verlag, 1967, 10th edition.

Due to the low swelling value, the carrier tubing has a high dimensional stability when wet from soaking in water. The cellulose hydrate or chemically modified cellulose hydrate forming the carrier tubing is characterized by a consolidated molecular structure. These properties are due to a high proportion of crystalline zones, as compared with known tubing of this general type, and in some cases these properties are due to chemical linking of cellulose hydrate molecules. These are preconditions for the product having the properties desired according to the invention. When the product is used in accordance with its intended purpose as an artificial sausage casing for cooked sausages or boiling sausages, these properties lead to the desired effect. Sausage preserves are to be understood as uncooked sausages, such as, for example, cervelat sausage, gut sausage, salami, peppered salami, minced fat pork sausage, minced ham sausage, cottage-smoked sausage or smoked sausage spread.

The low swelling value of the cellulose hydrate forming the carrier tubing is an expression of the fact that the tubing comprises a proportion of crystalline zones which is relatively large as compared with conventional tubular cellulose hydrate casings of the general type having a higher swelling value. It is assumed that water or aqueous fluid is unable, or virtually unable, to penetrate into these crystalline zones of the tubing, so that enzymes which are capable of chemically degrading cellulose hydrate molecules, in particular cellulases, cannot penetrate, or virtually cannot penetrate, into these zones.

The tubing wall, that is to say the inner and outer surfaces of the packaging material, contains chemical condensation products which additionally protect cellulose hydrate molecules from chemical degradation by enzymes, in particular cellulases, in a quantity which is the result of the indicated manufacture of the carrier tubing.

The properties of the product according to the invention are consequently the result of a combination of the two measures stated above.

To obtain the desired result, the chemical condensation product is advantageously present on the outside and on the inside of the carrier tubing. Since any condensation product which is present on the outside and on the inside partially covers the surface of the tubing, this contributes to the increase in resistance of the cellulose hydrate tubing to the attack of enzymes which degrade cellulose hydrate.

A negligibly thin layer composed of this condensation product on the surface of the carrier tubing does not form on the tubing a barrier layer, which would impede the passage of water vapor or air.

The carrier tubing has a wall thickness which advantageously corresponds to a weight per unit area in the range from about 80 to 110 g/m$^2$.

Upon soaking in water, the casing increases its surface area or its volume by extension in the direction of its longitudinal axis and in a radial direction in such a way that the surface area or the volume is in the region of from about 2 to 6%, in particular from about 3 to 5%, larger than in the unsoaked state. Soaking in water is to be understood as subjecting the casing to the action of water of a temperature in a range from about 40° to 50° C. for a period of about 30 minutes, for example, by placing it into a trough filled with water.

To determine the changes in the dimensions of the product in the wet state after soaking in water, in comparison with the dimensions of the product before soaking in water, a dry casing (water content from about 5 to 12% by weight) of defined length and defined diameter is taken, for example, a piece of tubing of 10 cm length and 9 cm diameter, and the piece of tubing is cut open along the longitudinal axis. The rectangular two-dimensional structure obtained is soaked in a trough filled with water at, for example, 50° C. for 30 minutes. The two-dimensional structure is then taken from the liquid, its area dimension is determined in the wet state and this is compared with its dimensions before soaking in water.

The wet state of the rectangular two-dimensional structure is to be understood as that state in which the particular specimen is immediately at the end of the action of water and after cooling to room temperature.

The determination of the dimensions of the two-dimensional structure soaked in water as indicated, while still in the wet state, makes it impossible for its dimensions to be reduced due to loss of water on drying.

The carrier tubing of the packaging material according to the invention has a total moisture content of from about 30 to 40% by weight, relative to its total weight, and it contains about 5 to 12% by weight of water as well as about 18 to 28% by weight of a chemical compound, known to be capable of plasticizing cellulose hydrate, in the form of polyols, in particular glycol, polyglycol or glycerol, in each case relative to the total weight of the packaging material.

The wall of the tubing, that is to say at least the inner and outer surfaces of the carrier tubing, contains a heat-cured, water-insoluble, synthetic condensation product which is selected from the group comprising condensation products of urea and formaldehyde, of melamine and formaldehyde, and preferably of epichlorohydrin and a polyamine or polyamine-polyamide.

As already explained above, these condensation products in the wall of the tubing, in combination with the particular physical structure of the cellulose hydrate forming the carrier tubing, protect the tubing from bacterially caused chemical degradation of cellulose hydrate molecules by micro-organisms, for example, by cellulases.

As a result of the manufacturing process, a layer of one of these condensation products is present on the outside of the tubing. The thickness of this layer, in comparison with the wall thickness of the carrier tubing based on preferably fiber-reinforced cellulose hydrate, is negligibly small and does not make any significant contribution to the dimensional stability. For example, the layer has a thickness corresponding to a weight per unit area within the range from about 10 to 100 mg, for example, about 80 mg, of the said condensation product per m$^2$ of substrate surface area. Cellulose hydrate tubing wherein the wall contains a protective layer of a condensation product is described in U.S. Pat. No. 3,378,379, the disclosure of which is hereby incorporated by reference.

The invention comprises three variants of a process for the manufacture of a product of the structure described above.

The process variants are described below, by way of example.

PROCESS VARIANT I

The starting material for carrying out the first variant of the process according to the invention is a tubing which is composed of cellulose hydrate gel and which is prepared from viscose by coagulation and has not yet been subjected to any drying step. The wall of the tubing contains a quantity of an aqueous solution of a chemical compound capable of plasticizing cellulose hydrate, this quantity corresponding to a swelling value of the cellulose hydrate gel, forming the tubing, within the range from about 280 to 320%, for example about 300%.

The aqueous solution contains the plasticizer in a quantity within the range from about 8 to 12% by weight, advantageously about 10% by weight, relative to its total weight.

Within the scope of the present description of the invention, the term "plasticizer for cellulose hydrate" comprises aliphatic polyhydroxy compounds, in particular polyols, selected from the group comprising glycerol, glycol and polyglycol, for example, polyglycol 2000.

The tubing of cellulose hydrate gel is, for example, fiber-reinforced and, advantageously, it has a paper fiber web incorporated into its wall.

These tubings per se and their manufacture form part of the state of the art.

The outer wall of the carrier tubing contains an impregnation which is composed of:

(a) a water-soluble pre-condensate obtained from urea and formaldehyde, or (b) a water-soluble pre-condensate obtained from formaldehyde and melamine, or (c) a water-soluble pre-condensate obtained from epichlorohydrin and a polyamine or polyamine-polyamide.

These pre-condensates are heat-curable under the action of heat, being converted to water-insoluble condensation products.

In the heat-cured state, the reaction products are termed heat-cured, water-insoluble synthetic condensation products.

When carrying out the process, by way of example, a water-soluble pre-condensate obtained from epichlorohydrin and a polyamine-polyamide is preferably present on the outside of the tubing of cellulose hydrate gel.

Water-soluble epichlorohydrin/polyamine/polyamide pre-condensates are described in U.S. Pat. No. 2,926,154 and U.S. Pat. No. 3,378,379 water soluble urea-formaldehyde pre-condensates are described in U.S. Pat. No. 2,616,874, and water-soluble melamine/formaldehyde pre-condensates are described in U.S. Pat. No. 2,796,362 and U.S. Pat. No. 2,345,543. The disclosure of each of these earlier patents is hereby incorporated by reference.

The impregnation on the outside of the tubing of cellulose hydrate gel with the indicated chemical compounds is carried out, for example, by spraying the outside of the tubing with an aqueous fluid which contains one of the said pre-condensates or by passing the tubing, for example, continuously through a trough which is filled with an aqueous impregnation fluid. For example, the fluid is composed of an aqueous solution which contains about 10 to 20 g/l, for example, 15 g/l, of dissolved epichlorohydrin/polyamine-polyamide pre-condensate. The impregnation fluid is brought into contact with the outside of the tubing by a method in which such a quantity of the said fluid is applied to the surface of the tubing that the dissolved fraction thereof is present on the surface of the tubing in a quantity within the range of from about 10 to 100 mg/m$^2$, for example, about 80 mg/m$^2$.

To carry out the process, the tubing of cellulose hydrate gel having, for example, a diameter of 90 mm is subjected continuously, while filled with supporting air, to a first heat treatment, during which no longitudinally acting tension force is allowed to affect the tubing, so that the particular integral section of tubing which is subjected to heat is able to shrink radially and longitudinally.

The pressure of the supporting air in the cavity of the tubing in the region of the zone of heat-treatment has a value, or is adjusted to a value, such that the tubing is capable of shrinking radially and longitudinally during the heat-treatment.

The particular part of the tubing passing through the zone of heat-treatment is subjected at the beginning of the heat-treatment to a temperature within the range from about 70° to 90° C. and, in the final stages, to a temperature within the range from about 100° to 130° C.

The total period during which the heat acts on the tubing is preferably about 1.5 to 3 minutes.

Passing the tubing without any tension along the longitudinal axis through the first heat-treatment zone is carried out in such a way that its speed of advance within the heat-treatment zone is retarded. Preferably, the speed of advance at the outlet of the tubing from the heat-treatment zone is about 2 to 10%, in particular about 3 to 6%, lower than that at the inlet to this zone. For example, the speed of advance of the tubing at the inlet to the heat treatment zone is 10 m/minute, while the tubing at the outlet from the latter has a speed of advance of 9.5 m/minute.

After the tubing has left the first heat treatment zone, the water content in its wall is, for example, about 8 to 10% by weight, and its fraction of plasticizers is within the range from about 18 to 24% by weight, in each case relative to the total weight of the tubing. After the first heat treatment, the tubing has a swelling value in the range between about 120 and 140%, for example, a swelling value of about 130%.

The first heat-treatment under the stated conditions can, for example, be accomplished as follows:

The tubing of cellulose hydrate gel, impregnated with pre-condensate on its outside and, if appropriate, on its inside, is continuously passed through a straight heating tunnel with a horizontally running longitudinal axis. The heating tunnel can, for example, also be equipped with electric heating elements which emit infrared radiation. The above-mentioned retardation of the speed of advance of the tubing is effected in the heating tunnel, for example, by pressing the tubing flat together over its entire width, when it enters the heating tunnel, and advancing it at the same time toward the end of the heating tunnel. The flattening is effected, for example, by passing the tubing through the roll nip of a pair of squeeze rollers which is the first pair in the direction of advance of the tubing and which is located at the beginning of the heating tunnel, and the rollers of which are designed so that they can be rotated and driven. For example, the rollers are driven by motors.

In the region of the roll nip of the first pair of squeeze rollers, the outsides of the flat compressed tubing are in frictional contact with the peripheral surfaces of the driven roller of the first pair of squeeze rollers. The longitudinal advance of the tubing is accomplished by the frictional contact of its surfaces with the peripheral surfaces of the rotating rollers of the first pair of squeeze rollers.

The tubing issuing from the roll nip of the first pair of squeeze rollers is passed through the heating tunnel and then through the roll nip of a second pair of squeeze rollers, located at the end of the heating tunnel. The second pair of squeeze rollers also has driven rollers. In the region of the roll nip of the second pair of squeeze rollers, the tubing is again compressed flat along a narrow zone. In the region of the roll nip of the second pair of squeeze rollers, the outside of the tubing is in frictional contact with the peripheral surfaces of the rollers of the second pair of squeeze rollers, each rotating at the same peripheral speed, whereby the tubing is delivered out of the heating tunnel.

The peripheral speed of the driven rollers of the second pair of squeeze rollers is about 2 to 10%, preferably about 3 to 6%, for example, about 4%, lower than the peripheral speed of the driven rollers of the first pair of squeeze rollers.

The peripheral speed of the driven rollers of the first pair of squeeze rollers is, for example, about 10 m/minute, while the peripheral speed of the rollers of the second pair of squeeze rollers is about 9.5 m/minute. The particular speed at which the tubing is delivered by the pairs of squeeze rollers corresponds to the peripheral speeds of the rollers of the particular pairs of rollers.

That part of the tubing which is located in the region between the roll nip of the first pair of squeeze rollers and the nip of the second pair of squeeze rollers is filled with supporting air.

The first pair of squeeze rollers at the inlet of the heating tunnel is preferably arranged, relative to the second pair of squeeze rollers at the outlet of the heating tunnel, in such a way that the longitudinal axis of the common roll nip plane which can be laid through the roll nips of the pairs of squeeze rollers, virtually coincides with the straight longitudinal axis of the drying tunnel. The pairs of squeeze rollers are here advantageously arranged in such a way that the roll nip of the first pair of squeeze rollers is located immediately at the beginning, and the roll nip of the second pair of squeeze rollers is located immediately at the end of the heating tunnel.

The region between the roll nip of the first pair of squeeze rollers and that of the second pair of squeeze rollers is that zone within which the tubing of cellulose hydrate gel is for the first time subjected to heat.

The tubing which has for the first time been subjected to heat and dried under the conditions indicated, is then moistened thoroughly with water.

After moistening, the tubing contains in its wall a liquid fraction within the range of from about 108 to 126% by weight, for example, about 117% by weight, relative to its total weight, wherein from about 8 to 12% by weight, for example, about 10% by weight, of the quantity of liquid in the tubing wall is constituted by plasticizers for cellulose hydrate, for example, glycerol.

The fraction of liquid in the tubing wall corresponds to the swelling value of the cellulose hydrate tubing.

The inside of the tubing is then coated with a fluid containing a pre-condensate, the qualitative and quantitative composition of this fluid corresponding to that of the fluid which has already been used for treating the outside of the tubing of cellulose hydrate gel. The coating of the inside of the tubing with the fluid can, for example, be carried out by means of the inside-coating technology described in U.S. Pat. No. 3,378,379, the disclosure of which is hereby incorporated by reference.

The tubing which has been moistened as indicated and, if appropriate, treated on its inside with a fluid containing a pre-condensate, is then subjected to a second heat-treatment and is thus dried.

During the second heat-treatment, the tubing is passed along its longitudinal axis continuously at a substantially constant speed through a heat-treating zone. Thus, the speeds of advance of the tubing at the inlet to the heat-treatment zone and the outlet from this zone are equal, or the speed at the outlet is only slightly greater, at most about 2%, for example, about 1%, greater than the speed at the inlet to this zone.

Each part of the tubing is here subjected to the action of heat for a total period within the range from about 1.5 to 3 minutes.

The temperature during the second heat-treatment increases in the heat-treating zone in the direction of advance of the tubing, and it is about 70° to 90° C., for example, about 80° C. at the beginning of the zone and, at the end thereof, it is about 100° to 130° C., for example, about 120° C. After the second heat-treatment, the tubing has a swelling value within the range from about 90 to 115%, for example, about 95%.

The second heat-treatment and the drying of the tubing is accordingly carried out while maintaining the temperatures indicated above, and the duration of heat-treatment corresponds to that which is used when carrying out the first drying. During the second drying, however, the peripheral speeds of the rollers of the first pair of squeeze rollers are equal to the peripheral speeds of the rollers of the second pair of squeeze rollers. The peripheral speeds of the rollers of the pairs of squeeze rollers are, for example, about 10 m/minute. The peripheral speed of the rollers of the second pair of squeeze rollers can, however, also be slightly, at most about 2%, for example, about 1%, greater than that of the rollers of the first pair of squeeze rollers. The speed of advance of the tubing on leaving the roll nip of each pair of squeeze rollers thus corresponds to the peripheral speed of the squeeze rollers and, at the outlet from the roll nip of the second pair of squeeze rollers, is equal to or at most about 2%, for example, about 1%, greater than that at the outlet from the nip of the first pair of squeeze rollers.

The dried tubing has a water content within the range from 5 to 12% by weight, for example, about 10% by weight, relative to its total weight.

If appropriate, the tubing is moistened with water in order to produce a defined final water content of about 5 to 12% by weight, for example, about 10% by weight, relative to the total weight of the tubing, in the wall of the tubing.

To moisten the tubing with water it is passed, for example, continuously through a trough filled with water.

The shrinking behavior of the packaging material after soaking in water, when it is used in accordance with its intended purpose as a sausage casing, is governed essentially by the particular manner of passing the tubing through the heat-treating zone during the first heat-treatment of the tubing. The low swelling value of the packaging material, as intended according to the invention, results from the combined special thermal conditions under which the first and second heat-treatments are carried out.

PROCESS VARIANT II

The second variant of the process according to the invention is explained in the following text, by way of example.

The starting material is, for example, a fiber-reinforced tubing which is composed of cellulose hydrate gel and has not been subjected to any prior heat treatment and has a swelling value in the range from about 280 to 320% by weight, for example, about 300% by weight. In the wall of the tubing, a quantity of an aqueous solution corresponding to the swelling value of the cellulose hydrate gel is present which contains plasticizers for cellulose hydrate, for example, glycerol, and an organic chemical compound which has at least two N-methylol groups in the molecule and is selected from a group of chemical compounds comprising cyclic urea compounds having two N-methylol groups in the molecule, for example, dimethyloldihydroxyethylene-urea (1,3-dimethylol-4,5-dihydroxy-imidazolin-2-one).

As the primary plasticizer, the aqueous solution contains glycerol in a quantity within the range from about 8 to 12% by weight, for example, about 10% by weight. The aqueous solution contains the bifunctional compounds which are capable of chemically linking cellulose hydrate, which have at least two N-methylol groups in the molecule and which are selected from the group comprising the chemical compounds indicated above, in a quantity within the range from about 0.5 to 5% by weight, for example, about 2.5% by weight, relative to the weight of the aqueous solution. The bifunctional chemical compounds, as indicated above, are described in U.S. Pat. No. 3,937,672.

The tubing contains the bifunctional chemical compounds having at least two N-methylol groups in the molecule, in a quantity of, for example, about 1 to 3% by weight, relative to the total weight of the cellulose hydrate in the tubing.

This precursor of the process product is obtained, for example, by causing an aqueous fluid which contains a compound capable of plasticizing cellulose hydrate, for example, glycerol, in a quantity within the range from about 5 to 12% by weight, for example, about 10% by weight, relative to its total weight, to act on the preferably fiber-reinforced tubing of cellulose hydrate gel, which has been prepared from viscose by coagulation and which has not yet been dried. Additionally, this solution contains an organic-chemical compound having at least two N-methylol groups in the molecule, for example, dimethyloldihydroxyethylene-urea, in a quantity within the range from about 0.5 to 5% by weight, in particular, from about 1.5 to 3% by weight, relative to the total weight of the solution.

To carry out this plasticizer treatment, the tubing of cellulose hydrate gel is passed continuously through a trough filled with the fluid.

The outside and inside of the tubing treated as above are then each treated with a fluid which contains a water-soluble pre-condensate, and the composition of which was described in connection with the first process variant. The treatment is carried out, for example, as indicated for the first process variant.

The tubing of cellulose hydrate gel is then subjected to the action of heat and is dried, with the same conditions, in particular with respect to temperature, speed of the tubing and time of the action of heat, being maintained as during the first heat-treatment according to the first process variant.

After this heat treatment, the tubing already has a swelling value in the range from about 90 to 115%, for example, about 100%.

If appropriate, the tubing is moistened with water in the same way as indicated in the explanation of the first process variant.

The desired shrinking behavior of the packaging material after soaking in water, when it is used in accordance with its intended purpose, is governed by the particular manner of passing the tubing through the heat-treatment zone, under conditions which permit shrinking of the tubing.

The low swelling value, desired according to the invention, of the process product is a consequence of the chemical structure of the carrier tubing. During the heat treatment, the cellulose hydrate molecules of the tubing are chemically linked by the bifunctional chemical compound in the tubing wall, whereby a low swelling value of the tubing is achieved.

PROCESS VARIANT III

The way in which the third variant of the process according to the invention is carried out differs from that in which the second variant of the process is carried out, in the following points:

1. The starting tubing corresponds to the cellulose hydrate gel of process variant I, that is to say it is not chemically modified. Its outer and inner surfaces have been treated with a fluid containing a plasticizer and with a fluid containing a pre-condensate.
2. The heat treatment on the tubing has a temperature in the range from about 90° to 110° C., preferably about 100° C., at the beginning of the heat-treatment zone and, at the end, has a temperature in the range from about 140° to 160° C., preferably about 150° C. The tubing is subjected to the action of heat for a total period in the range from about 3 to 8 minutes, for example, about 6 minutes. The action of heat is effected analogously to process variant I, under conditions which permit shrinkage of the tubing.

After the heat-treatment, the tubing has a swelling value in the range from about 90 to 115%, for example, 100%. A second heat treatment is not necessary.

The low swelling value and the shrinking behavior of the packaging material manufactured by the third process variant, when it is used in accordance with its intended purpose as a sausage casing, are governed by the special heat treatment.

In the three process variants for the manufacture of the packaging material, the essential point of the first process variant is that the starting tubing is initially subjected to the indicated first thermal treatment, for a defined duration of the action of heat and at a defined temperature, under conditions which permit shrinking, whereupon it is moistened and is subsequently subjected under conditions virtually free from tension to a second heat treatment under the indicated conditions, whereby the swelling value of the cellulose hydrate constituting the tubing is reduced in each case from an initial value to an end value which is lower by comparison, during each of the two heat treatment steps. The initial swelling value of the tubing at the beginning of the second heat-treating step corresponds to the swelling value of the tubing after the first heat treatment.

When the second process variant is carried out, it is essential for the properties of the product according to the invention, that the starting tubing is composed of a chemically modified cellulose hydrate and the tubing is subjected to the single heat treatment under conditions which permit shrinking, at the stated temperatures and periods of heating.

For the effect intended by the invention to occur, it is essential when carrying out the third process variant, that the starting tubing of the indicated chemical structure is subjected to the single intense heat treatment under conditions which permit shrinking.

What is claimed is:

1. A water-permeable tubular packaging material, consisting essentially of a carrier tubing comprised of cellulose hydrate and containing in its wall from about 5 to 12% by weight of water and from about 18 to 28% by weight of a plasticizer for cellulose hydrate, in each instance relative to the total weight of the carrier tubing; and a coating on the inside and on the outside of said carrier tubing of a water-insoluble, heat-cured synthetic condensation product comprised of urea/formaldehyde, formaldehyde/melamine, epichlorohydrin/polyamine or epichlorohydrin/polyamine/polyamide, wherein the carrier tubing is characterized by a swelling value in the range from about 80 to 120%, and the tubular packaging, after soaking in water at a temperature between about 40° to 50° C. for a period of about 30 minutes and subsequent cooling to about room temperature, is characterized by dimensions in the wet state which are 2 to 6% greater than those before said soaking in water.

2. A packaging material as claimed in claim 1, wherein said carrier tubing is comprised of cellulose hydrate which has been chemically modified by means of an organic chemical compound which has at least two N-methylol groups in the molecule.

3. A process for the manufacture of a tubular, water-permeable packaging material consisting essentially of the steps of:

treating at least the outside surface of a plasticizer-containing tubing which is comprised of cellulose hydrate gel and which has not yet been subjected to any preceding heat treatment, with a fluid containing a water-soluble pre-condensate comprising urea/formaldehyde, formaldehyde/melamine, epichlorohydrin/polyamine or epichlorohydrin/polyaminepolyamide; passing the treated tubing continuously along its longitudinal axis through a first heat-treating zone under conditions which permit shrinking and thus drying it, the effective temperature being in the range from about 70° to 90° C. at the beginning of the first heat-treating zone and being in the range from about 100° to 130° C. at the end of the first heat-treating zone; remoistening the dried tubing; and passing the tubing continuously through a second heat-treating zone and thus drying it, wherein the speed of advance of the tubing at the outlet of the second heat-treating zone is equal to or at most 2% greater than that at the inlet to the second heat-treating zone.

4. A process for the manufacture of a packaging material as claimed in claim 3, wherein said treating step comprises treating both the outside and the inside surface of the tubing with said pre-condensate-containing fluid.

5. A process for the manufacture of a packaging material as claimed in claim 3, wherein said remoistening step comprises treating the inside of the tube with a fluid containing said pre-condensate.

6. A process as claimed in claim 3, wherein the speed of advance of the tubing at the outlet of the first heat-treating zone is from about 2 to 10% lower than the speed of advance at the inlet to this zone.

7. A process as claimed in claim 3, wherein said first heat-treating step comprises passing the tubing through the roll nip of a first pair of squeeze rollers having driven rollers each rotating at the same first peripheral speed, and after the water-insoluble coating of condensation product has been formed and the tubing has been dried, passing the tubing through the roll nip of a second pair of squeeze rollers, which is located at a distance from the first pair and has driven rollers each rotating at the same second peripheral speed, the first peripheral speed being about 2 to 10% greater than the second peripheral speed, and further comprising the step of filling the tubing with supporting gas while passing between the first and second pairs of squeeze rollers.

8. A process as claimed in claim 7, wherein in the first heat-treating zone the tubing is subjected to the action of heat for a period in the range from about 1.5 to 3 minutes.

9. A process as claimed in claim 3, wherein the temperature prevailing at the beginning of the second heat-treating zone is within the range from about 70° to 90° C. and the temperature prevailing at the end of the second heat-treating zone is within the range from about 100° to 130° C.

10. A process as claimed in claim 9, wherein the tubing is maintained in the second heat-treating zone for a period in the range from about 1.5 to 3 minutes.

11. A process for the manufacture of a packaging material as claimed in claim 1, comprising the steps of:
    treating the outside and the inside surface of a plasticizer-containing tubing which is comprised of cellulose hydrate gel and which has not yet been subjected to any preceding heat treatment, with a fluid containing a water-soluble pre-condensate comprising urea/formaldehyde, formaldehyde/melamine, epichlorohydrin/polyamine or epichlorohydrin/polyaminepolyamide; and
    subjecting the treated tubing to a single heat-treatment under conditions which permit shrinking of the part of the tubing, the temperature prevailing during heat-treatment being sufficient to form said water-insoluble, heat-cured synthetic condensation product from said pre-condensate and to dry the tubing.

12. A process as claimed in claim 11, wherein the temperature at the beginning of said heat-treatment is in the range from about 90° to 110° C. and the temperature prevailing at the end of said heat-treatment is in the range from about 140° to 160° C.

13. A process as claimed in claim 11, wherein the tubing contains in its wall a chemical agent containing at least two N-methylol groups in the molecule for cross-linking the cellulose hydrate molecules, and wherein the tubing is subjected at the beginning of said heat-treatment to a temperature in the range of from about 70° to 90° C. and at the end of said heat-treatment to a temperature in the range of from about 100° to 130° C.

14. A process as claimed in claim 12 or 13, wherein the speed of advance of the tubing along its longitudinal axis at the outlet of said heat-treatment is from about 2 to 10% lower than that at the inlet to said heat-treatment.

15. A process as claimed in claim 14, wherein said heat-treatment step comprises passing the tubing through the roll nip of a first pair of squeeze rollers having driven rollers each rotating at the same first peripheral speed, and then passing the tube through the roll nip of a second pair of squeeze rollers, which is located at a distance from the first pair provided and has driven rollers each rotating at the same second peripheral speed, the first peripheral speed being about 2 to 10% greater than the second peripheral speed, and further comprising the step of filling the tubing with a supporting gas in the space between the first pair of squeeze rollers and the second pair of squeeze rollers.

16. A process as claimed in claim 15, wherein the tubing is subjected to said heat-treatment for a period in the range from about 3 to 8 minutes.

17. A sausage casing comprising the tubular packaging material defined by claim 1.

18. A sausage casing as claimed in claim 17, further comprising a sausage filling contained inside of said casing.

* * * * *